(12) United States Patent
Cusin et al.

(10) Patent No.: US 10,343,234 B2
(45) Date of Patent: Jul. 9, 2019

(54) FABRICATION METHOD INCLUDING A MODIFIED ASSEMBLY STEP

(71) Applicant: Nivarox-FAR S.A., Le Locle (CH)

(72) Inventors: Pierre Cusin, Villars-Burquin (CH); Davy Cretenet, La Chaux-de-Gilley (FR); Marc Stranczl, Nyon (CH); Raphael Garret, La Chaux-de-Fonds (CH)

(73) Assignee: Nivarox-FAR S.A., Le Locle (CH)

( * ) Notice: Subject to any disclaimer, the term of this patent is extended or adjusted under 35 U.S.C. 154(b) by 488 days.

(21) Appl. No.: 15/164,060

(22) Filed: May 25, 2016

(65) Prior Publication Data

US 2016/0368092 A1    Dec. 22, 2016

(30) Foreign Application Priority Data

Jun. 16, 2015 (EP) ..................................... 15172339

(51) Int. Cl.
| | |
|---|---|
| *G04B 17/06* | (2006.01) |
| *B23K 26/21* | (2014.01) |
| *B23K 26/32* | (2014.01) |
| *G04B 17/34* | (2006.01) |
| *G04B 13/02* | (2006.01) |
| *G04B 15/14* | (2006.01) |
| *G04B 19/04* | (2006.01) |
| *B23K 101/00* | (2006.01) |

(Continued)

(52) U.S. Cl.
CPC .............. *B23K 26/21* (2015.10); *B23K 26/32* (2013.01); *G04B 13/02* (2013.01); *G04B 15/14* (2013.01); *G04B 17/34* (2013.01);

*G04B 19/044* (2013.01); *B23K 2101/00* (2018.08); *B23K 2103/02* (2018.08); *B23K 2103/08* (2018.08); *B23K 2103/12* (2018.08); *B23K 2103/14* (2018.08); *B23K 2103/18* (2018.08); *B23K 2103/52* (2018.08)

(58) Field of Classification Search
CPC .. G04B 17/066; G04B 17/063; G04B 17/227; G04D 3/0041
See application file for complete search history.

(56) References Cited

U.S. PATENT DOCUMENTS

| 3,429,120 A | * | 2/1969 | Charpilloz | ........... | G04B 17/345 |
| | | | | | 368/177 |
| 3,934,406 A | * | 1/1976 | Bornand | ................ | G04B 17/32 |
| | | | | | 368/325 |

(Continued)

FOREIGN PATENT DOCUMENTS

| CH | 564 799 | 7/1975 |
| CH | 705 464 A2 | 3/2013 |

(Continued)

OTHER PUBLICATIONS

European Search Report dated Dec. 17, 2015 in European Application 15172339, filed on Jun. 16, 2015 ( with English translation).

*Primary Examiner* — Dana Ross
*Assistant Examiner* — Lawrence H Samuels
(74) *Attorney, Agent, or Firm* — Oblon, McClelland, Maier & Neustadt, L.L.P.

(57) ABSTRACT

The invention relates to a fabrication method including an assembly step for inserting an intermediate part intended to ensure the flatness of the face to be welded.

20 Claims, 3 Drawing Sheets

(51) Int. Cl.
*B23K 103/02* (2006.01)
*B23K 103/08* (2006.01)
*B23K 103/12* (2006.01)
*B23K 103/14* (2006.01)
*B23K 103/18* (2006.01)
*B23K 103/00* (2006.01)

(56) References Cited

U.S. PATENT DOCUMENTS

| | | | | |
|---|---|---|---|---|
| 4,746,582 A | * | 5/1988 | Tsuno | B23K 35/002 |
| | | | | 428/627 |
| 4,865,896 A | * | 9/1989 | Yoshida | B23K 35/02 |
| | | | | 428/116 |
| 5,912,064 A | * | 6/1999 | Azuma | G04B 19/12 |
| | | | | 136/251 |
| 6,955,975 B2 | * | 10/2005 | Reichenbach | B29C 65/608 |
| | | | | 257/E21.122 |
| 7,435,377 B2 | * | 10/2008 | Cho | B22F 7/062 |
| | | | | 419/14 |
| 9,428,382 B2 | * | 8/2016 | Hessler | G04B 17/06 |
| 2004/0082145 A1 | * | 4/2004 | Reichenbach | B29C 65/1683 |
| | | | | 438/455 |
| 2007/0034416 A1 | * | 2/2007 | Cho | B22F 7/062 |
| | | | | 175/434 |
| 2008/0008053 A1 | * | 1/2008 | Zimmermann | G04B 3/06 |
| | | | | 368/319 |
| 2010/0110840 A1 | * | 5/2010 | Zaugg | G04B 17/066 |
| | | | | 368/177 |
| 2010/0290320 A1 | | 11/2010 | Gygax et al. | |
| 2011/0005055 A1 | * | 1/2011 | Gigandet | G04B 13/026 |
| | | | | 29/428 |
| 2011/0103200 A1 | | 5/2011 | Cusin | |
| 2014/0241134 A1 | * | 8/2014 | Niwa | G04B 17/22 |
| | | | | 368/127 |
| 2014/0242273 A1 | * | 8/2014 | Poffet | B29C 45/1679 |
| | | | | 427/164 |
| 2015/0185701 A1 | | 7/2015 | Tobenas Borron | |
| 2015/0344300 A1 | * | 12/2015 | Hessler | G04B 17/06 |
| | | | | 216/33 |

FOREIGN PATENT DOCUMENTS

| | | | | |
|---|---|---|---|---|
| CH | 705464 A2 | * | 3/2013 | G04B 17/345 |
| CH | 708 670 A2 | | 4/2015 | |
| EP | 1 705 533 A1 | | 9/2006 | |
| EP | 2 107 433 A1 | | 10/2009 | |
| EP | 2 317 406 A1 | | 5/2011 | |
| WO | WO 2009/068091 A1 | | 6/2009 | |
| WO | WO 2014/006229 A1 | | 1/2014 | |
| WO | WO 2015185423 A2 | * | 12/2015 | G04D 3/00 |

* cited by examiner

FABRICATION METHOD INCLUDING A MODIFIED ASSEMBLY STEP

This application claims priority from European Patent Application No. 15172339.2 filed on Jun. 16, 2015, the entire disclosure of which is hereby incorporated herein by reference.

FIELD OF THE INVENTION

The invention relates to a fabrication method including a modified assembly step and, more specifically, a step of this type that provides improved surface flatness.

BACKGROUND OF THE INVENTION

It is known from WO Publication 2015/185423 how to form a timepiece component from a part comprising a silicon-based or ceramic-based material which is welded by electromagnetic radiation directly onto another part, such as, for example, a metal or a metal alloy.

In the context of this development, it transpired that it was important for the gap between the parts not to exceed 0.5 micrometer, otherwise they could not be welded together.

SUMMARY OF THE INVENTION

It is an object of the present invention to overcome all of part of aforecited drawbacks by proposing a new fabrication method with at least one contact surface having improved flatness that enables parts to be assembled by welding.

To this end, according to a first embodiment, the invention relates to a method for fabrication of a timepiece component including the following steps:

forming a first part made from metal and a second part made from silicon or from ceramic;

mounting an intermediate part on a shoulder of the first part;

mounting a first surface of the second part on a surface of the intermediate part and a second surface of the second part on a surface of the first part;

welding, by laser electromagnetic radiation, the surface of the second part mounted on the surface of the intermediate part, in order to secure them to each other and to form the timepiece component;

Further, according to a second embodiment, the invention relates to a method for fabrication of a timepiece component including the following steps:

forming a first part made from metal and a second part made from silicon or from ceramic;

welding, by laser electromagnetic radiation, a surface of the second part onto an intermediate part, in order to secure them to each other;

mounting the assembly of the second part—intermediate part on the first part so that the intermediate part is mounted on a shoulder of the first part and so that a surface of the second part is mounted on a surface of the first part to form the timepiece component.

It is thus understood that, according to the two embodiments, the fabrication method uses an intermediate part with a face having at least one perfectly flat and perpendicular surface in order to ensure welding to the second part.

In accordance with other advantageous variants of the invention:

the second part also includes at least a partial coating of metal, silicon oxide, silicon nitride, silicon carbide or an allotrope of carbon;

the first part includes an iron alloy, a copper alloy, nickel or an alloy thereof, titanium or an alloy thereof, gold or an alloy thereof, silver or an alloy thereof, platinum or an alloy thereof, ruthenium or an alloy thereof, rhodium or an alloy thereof, or palladium or an alloy thereof;

the intermediate part includes an iron alloy, a copper alloy, nickel or an alloy thereof, titanium or an alloy thereof, gold or an alloy thereof, silver or an alloy thereof, platinum or an alloy thereof, ruthenium or an alloy thereof, rhodium or an alloy thereof, or palladium or an alloy thereof;

the second part forms all or part of a case, a dial, a flange, a crystal, a bezel, a push-piece, a crown, a case back, a hand, a bracelet or strap, a balance spring, a balance wheel, a pallets, a bridge, an oscillating weight, a wheel or an escape wheel.

BRIEF DESCRIPTION OF THE DRAWINGS

Other features and advantages will appear clearly from the following description, given by way of non-limiting illustration, with reference to the annexed drawings, in which.

DETAILED DESCRIPTION OF PREFERRED EMBODIMENTS

The invention relates to a component formed using a material having no usable plastic range i.e. with a very limited plastic range, with another part comprising the same type of material or a different type of material.

This component was devised for applications in the field of horology and is rendered necessary by the increasing part played by fragile, brittle materials, such as silicon-based or ceramic-based materials. It is possible, for example, to envisage forming a case, a dial, a flange, a crystal, a bezel, a push-button, a crown, a case back, a hand, a bracelet or strap, a balance spring, a balance wheel, a pallets, a bridge or bar, an oscillating weight or even a wheel, such as an escape wheel, entirely or partially from fragile or brittle materials.

Preferably, the silicon-based material used to make the compensated balance spring may be single crystal silicon, regardless of its crystal orientation, doped single crystal silicon, regardless of its crystal orientation, amorphous silicon, porous silicon, polycrystalline silicon, silicon nitride, silicon carbide, quartz, regardless of its crystal orientation, or silicon oxide. Of course, other materials may be envisaged, such as glass, ceramics, cermets, metals or metal alloys. Further, the first silicon-based part may also optionally include at least one partial coating of silicon oxide, silicon nitride, silicon carbide or an allotrope of carbon, depending upon the intended applications of the timepiece component.

As explained above, the other part may include the same type of material or another type of material. Therefore, preferably, the other part is metal-based and may include an iron alloy, a copper alloy, nickel or an alloy thereof, titanium or an alloy thereof, gold or an alloy thereof, silver or an alloy thereof, platinum or an alloy thereof, ruthenium or an alloy thereof, rhodium or an alloy thereof, or palladium or an alloy thereof.

Figure 1:
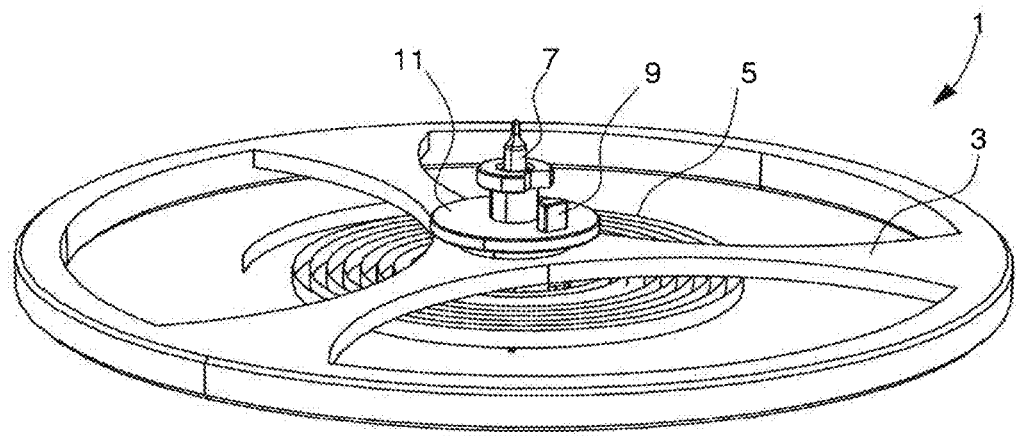
FIG. 1 is a perspective view of a sprung balance resonator.

For the sake of simplicity, the explanation below will concern an assembly between a balance spring and a balance staff. FIG. 1 shows a resonator 1 wherein the balance spring 5 is used for temperature compensation of the entire resonator assembly 1, i.e. all the parts and particularly the balance wheel 3 mounted on the same balance staff 7. Resonator 1 cooperates with a maintenance system, such as, for example, a Swiss lever escapement (not shown) cooperating with the impulse pin 9 of table-roller 11 which is also mounted on staff 7.

Figure 2:
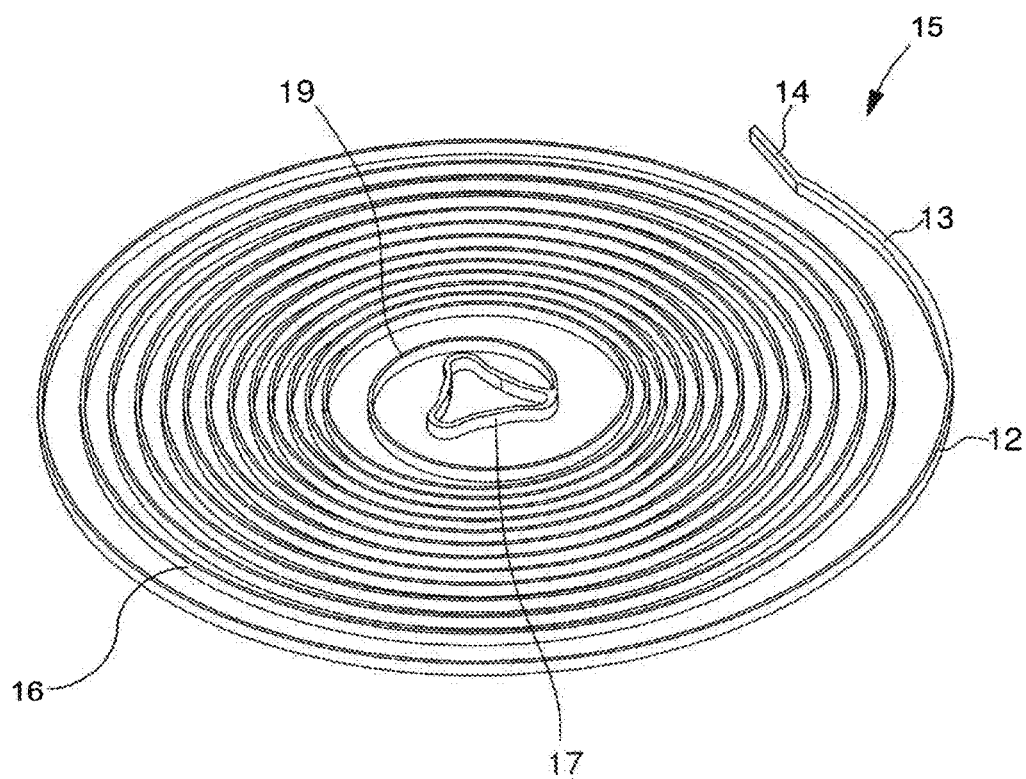
FIG. 2 is a perspective view of a balance spring according to the invention.

A compensating balance spring 15 is shown more clearly in FIG. 2. It includes a single strip 16 wound on itself between an inner coil 19 integral with a collet 17 and an outer coil 12 comprising an end 14 intended to be pinned up to the stud. As seen in FIG. 2, in order to improve the isochronism of the resonator in which balance spring 15 is used, the latter includes an inner coil 19 comprising a Grossmann curve and an outer coil 12 comprising a portion 13 that is thickened relative to the rest of balance spring 15. Finally, it can be seen that collet 17 comprises a single strip extending in a substantially triangular shape so that the collet exhibits elasticity when it is fitted onto the staff, in particular to enable it to be centred relative to the staff.

Figure 3:
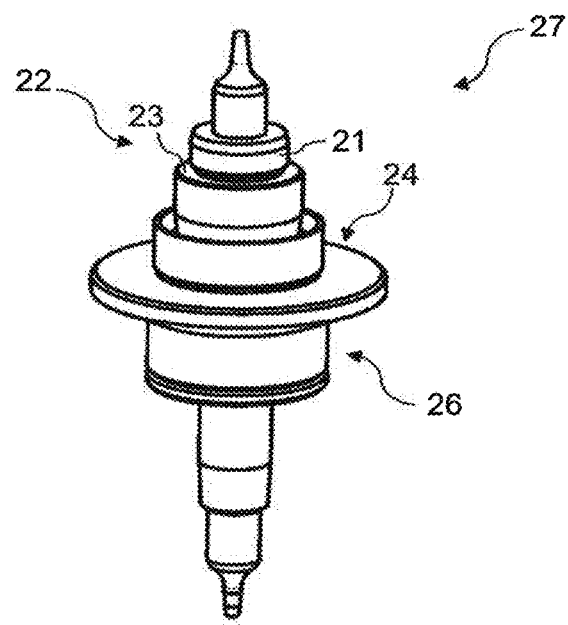
FIG. 3 is a perspective view of a balance staff according to the invention.

A staff 27 is illustrated more clearly in FIG. 3. It includes, in particular, several diameter portions 22, 24, 26 respectively intended to receive the balance spring, the balance wheel and the table-roller. As illustrated in FIG. 3, diameter portion 22 includes a cylindrical shaft 21, the lower portion of which is edged with a shoulder 23.

Figure 4:
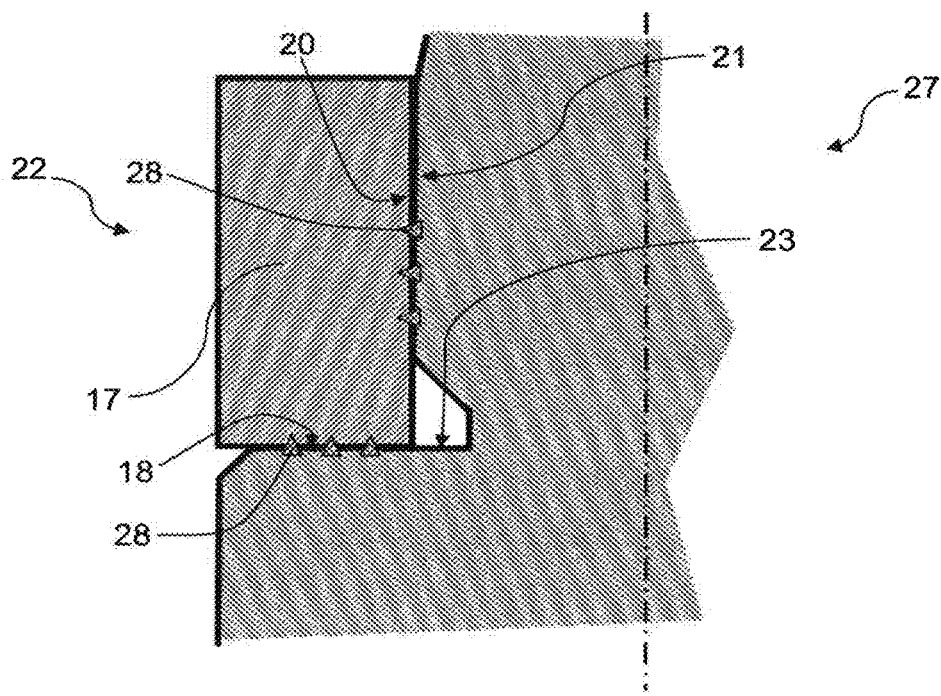
FIG. 4 is a cross-sectional view of an assembly according to WO Publication 2015/185423.

As illustrated in FIG. 4, diameter portion 22 is intended to receive, between shaft 21 and shoulder 23, collet 17 of balance spring 15. More specifically, the inner face 20 of collet 17 is resiliently pressed against the outer surface of shaft 21 and the lower face 18 of collet 17 is pressed against shoulder 23. Finally, as indicated at reference 28, shaft 21 and/or shoulder 23 is welded to collet 17 in accordance with the teaching of WO Publication 2015/185423.

However, within the context of developing the teaching of WO Publication 2015/185423, it very soon became clear that the gap between the parts must not exceed 0.5 micrometer, otherwise they cannot be welded together.

According to the invention, the fabrication method includes a step intended to insert an intermediate part so as to provide a face with a perfectly flat and perpendicular surface ensuring welding.

According to a first embodiment, the method according to the invention includes a first step intended to form a first part made from metal, such as, in the present example, a staff 37 and a second part, such as, in the present example, a balance spring 15 made from silicon.

The method continues with a second step intended to mount an intermediate part 41 such as, for example, a washer, on a shoulder 33 of the first part formed by staff 37. Advantageously, this intermediate part 41 has a perfectly flat and perpendicular surface ensuring welding to the second part formed, in particular, by collet 17 of balance spring 15.

The intermediate part 41 may consequently be formed from a metal and, for example, be driven against the substantially vertical shaft 31 of the first part formed by staff 37. It is therefore understood that the second part, formed in particular by collet 17, will not be welded onto shaft 21 and/or shoulder 23 as in the FIG. 4 example, but onto shaft 31 and/or intermediate part 41.

Figure 5:
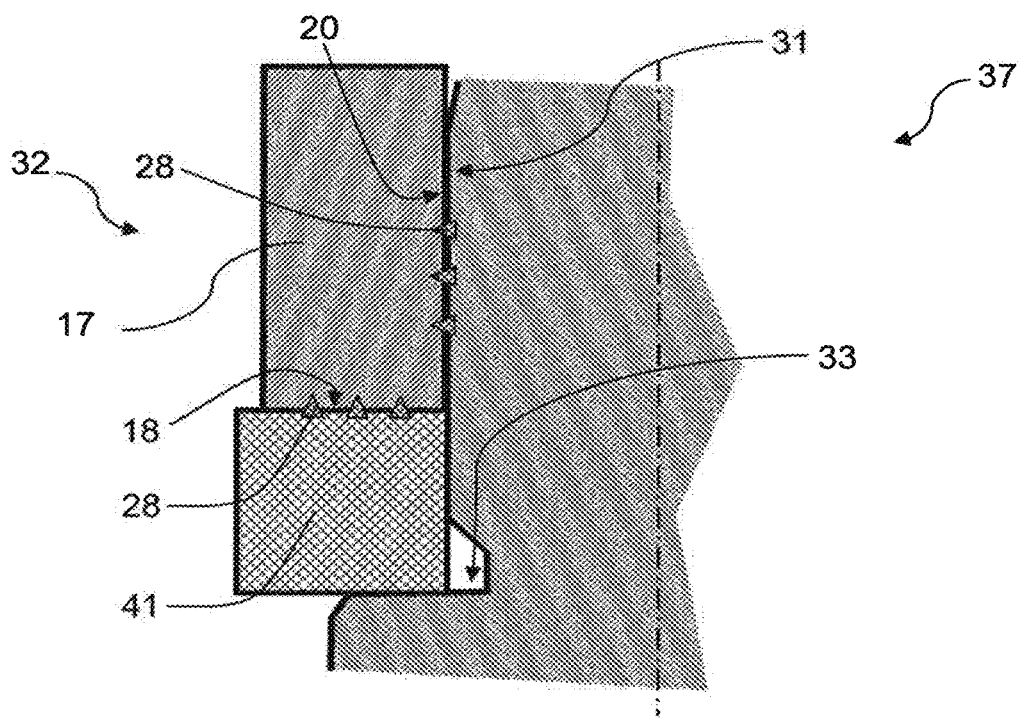
FIG. 5 is a cross-sectional view of an assembly according to the invention.

The method then includes a third step intended to mount a surface of the second part, formed in particular by collet 17, onto a surface of intermediate part 41, as illustrated in FIG. 5.

Finally, the method ends with a step intended to weld, by laser electromagnetic radiation, the surface of the second part, formed in particular by collet 17, mounted on the surface of intermediate part 41, in order to secure them to each other along weld joints 28 with the assurance that balance spring 15 and staff 37 are joined to each other owing to the good flatness of intermediate part 41.

Of course, as seen in FIG. 5, weld joints 28 could, alternatively or additionally, be formed in this last step between shaft 31 and collet 17.

According to a second embodiment, the method according to the invention includes a first step intended to form a first part made from metal, such as, in the present example, a staff 37, and a second part such as, in the present example, a balance spring 15 made from silicon.

The method continues with a second step intended to weld, by laser electromagnetic radiation, a surface of the second part, formed in particular by collet 17 of balance spring 15, onto an intermediate part 41, such as, for example, a washer, in order to join them to each other.

Advantageously, this intermediate part 41 has a perfectly flat and perpendicular surface ensuring welding to the second part, formed in particular by collet 17, along weld joints 28, with the assurance that balance spring 15 and intermediate part 41 are joined to each other, owing to the good flatness of intermediate part 41.

Intermediate part 41 may, consequently, also be formed from a metal. It is therefore understood that the second part, formed in particular by collet 17, will no longer be welded onto shaft 21 and/or shoulder 23 as in the FIG. 4 example, but onto shaft 31 and/or intermediate part 41.

Finally, the method ends with a step intended to mount the assembly of the second part (formed in particular by collet 17)—intermediate part 41 onto a shoulder 33 of the first part formed by staff 37 with the assurance that balance spring 15 and staff 37 are joined to each other.

As seen in FIG. 5, weld joints 28 could additionally be formed in this last step between shaft 31 and collet 17.

Of course, this invention is not limited to the illustrated example but is capable of various variants and alterations that will appear to those skilled in the art. In particular, intermediate part 41 is not limited to a square section forming a ring. By way of non-limiting example, the section could alternatively be L-shaped to form a ring provided with a one-piece collar or a one-piece ring. It is thus understood that intermediate part 41 alone could receive collet 17 single-handedly by providing two respectively vertical and horizontal surfaces having improved flatness compared respectively to the surfaces of shaft 31 and of shoulder 33.

What is claimed is:
1. A method for fabrication of a timepiece component comprising:
   forming a first part made from metal and a second part made from silicon or ceramic;
   mounting an intermediate part on a shoulder of the first part;
   mounting a first surface of the second part directly on a surface of the intermediate part and a second surface of the second part directly on a surface of the first part; and welding, by laser electromagnetic radiation, the first surface of the second part to the surface of the intermediate part and welding the second surface of the second part to the surface of the first part, in order to secure the first part, the second part, and the intermediate part to each other and to form the timepiece component.

2. The method according to claim 1, wherein the second part also includes at least a partial coating of metal, silicon oxide, silicon nitride, silicon carbide or an allotrope of carbon.

3. The method according to claim 1, wherein the first part includes an iron alloy, a copper alloy, nickel or an alloy thereof, titanium or an alloy thereof, gold or an alloy thereof, silver or an alloy thereof, platinum or an alloy thereof, ruthenium or an alloy thereof, rhodium or an alloy thereof, or palladium or an alloy thereof.

4. The method according to claim 1, wherein the intermediate part includes an iron alloy, a copper alloy, nickel or an alloy thereof, titanium or an alloy thereof, gold or an alloy thereof, silver or an alloy thereof, platinum or an alloy thereof, ruthenium or an alloy thereof, rhodium or an alloy thereof, or palladium or an alloy thereof.

5. The method according to claim 1, wherein the second part forms all or part of a case, a dial, a flange, a crystal, a bezel, a push-piece, a crown, a case back, a hand, a bracelet or strap, a balance spring, a balance wheel, a pallets, a bridge, an oscillating weight, a wheel or an escape wheel.

6. A method for fabrication of a timepiece component comprising:
    forming a first part made from metal and a second part made from silicon or ceramic;
    welding, by laser electromagnetic radiation, a first surface of the second part onto an intermediate part, in order to secure the second part and the intermediate part directly to each other;
    mounting an assembly of the second part and the intermediate part onto the first part so that the intermediate part is mounted on a shoulder of the first part and so that a second surface of the second part is mounted on a surface of the first part; and
    welding the second surface of the second part directly to the surface of the first part to form the timepiece component.

7. The method according to claim 6, wherein the second part also includes at least a partial coating of metal, silicon oxide, silicon nitride, silicon carbide or an allotrope of carbon.

8. The method according to claim 6, wherein the first part includes an iron alloy, a copper alloy, nickel or an alloy thereof, titanium or an alloy thereof, gold or an alloy thereof, silver or an alloy thereof, platinum or an alloy thereof, ruthenium or an alloy thereof, rhodium or an alloy thereof, or palladium or an alloy thereof.

9. The method according to claim 6, wherein the intermediate part includes an iron alloy, a copper alloy, nickel or an alloy thereof, titanium or an alloy thereof, gold or an alloy thereof, silver or an alloy thereof, platinum or an alloy thereof, ruthenium or an alloy thereof, rhodium or an alloy thereof, or palladium or an alloy thereof.

10. The method according to claim 6, wherein the second part forms all or part of a case, a dial, a flange, a crystal, a bezel, a push-piece, a crown, a case back, a hand, a bracelet or strap, a balance spring, a balance wheel, a pallets, a bridge, an oscillating weight, a wheel or an escape wheel.

11. The method according to claim 1, wherein a cross section of the second part forms a rectangle, the first surface of the second part is welded to the surface of the intermediate part at a bottom face of the rectangle, and the second surface of the second part is welded to the surface of the first part at a right face of the rectangle.

12. The method according to claim 11, wherein the right face of the rectangle formed by the cross section of the second part faces radially inward to contact the surface of the first part, the surface of the first part facing radially outward.

13. The method according to claim 12, wherein the intermediate part is positioned below the bottom face of the rectangle formed by the cross section of the second part.

14. The method according to claim 1, wherein the first part is a staff and the second part is a collet mounted on the staff.

15. The method according to claim 14, wherein the first part is welded to the second part such that the second surface of the second part is a radially inward face of the collect and the surface of the first part is a radially outward face of the staff.

16. The method according to claim 6, wherein a cross section of the second part forms a rectangle, the first surface of the second part is welded to the surface of the intermediate part at a bottom face of the rectangle, and the second surface of the second part is welded to the surface of the first part at a right face of the rectangle.

17. The method according to claim 16, wherein the right face of the rectangle formed by the cross section of the second part faces radially inward to contact the surface of the first part, the surface of the first part facing radially outward.

18. The method according to claim 17, wherein the intermediate part is positioned below the bottom face of the rectangle formed by the cross section of the second part.

19. The method according to claim 6, wherein the first part is a staff and the second part is a collet mounted on the staff.

20. The method according to claim 19, wherein the first part is welded to the second part such that the second surface of the second part is a radially inward face of the collect and the surface of the first part is a radially outward face of the staff.

* * * * *